Figure 4:
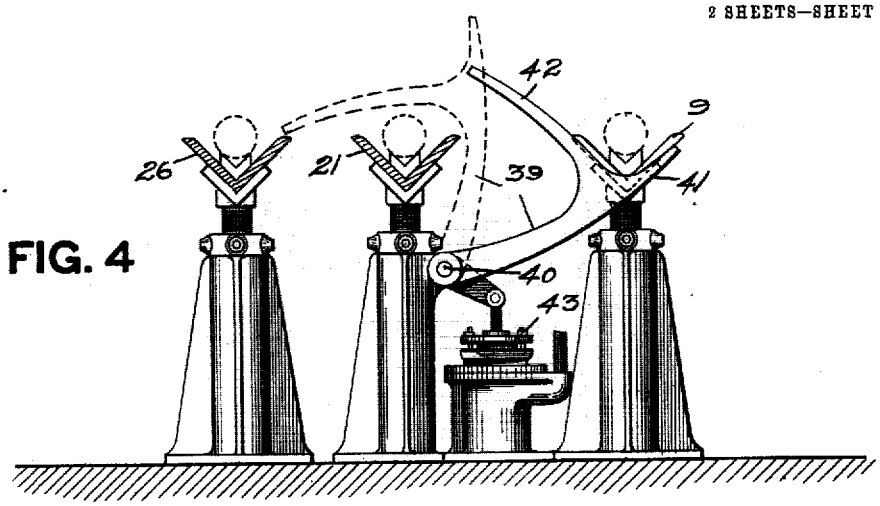

No. 825,421. PATENTED JULY 10, 1906.
A. M. SAUNDERS.
APPARATUS FOR THE MANUFACTURE OF PIPE.
APPLICATION FILED JAN 23, 1904.
2 SHEETS—SHEET 1
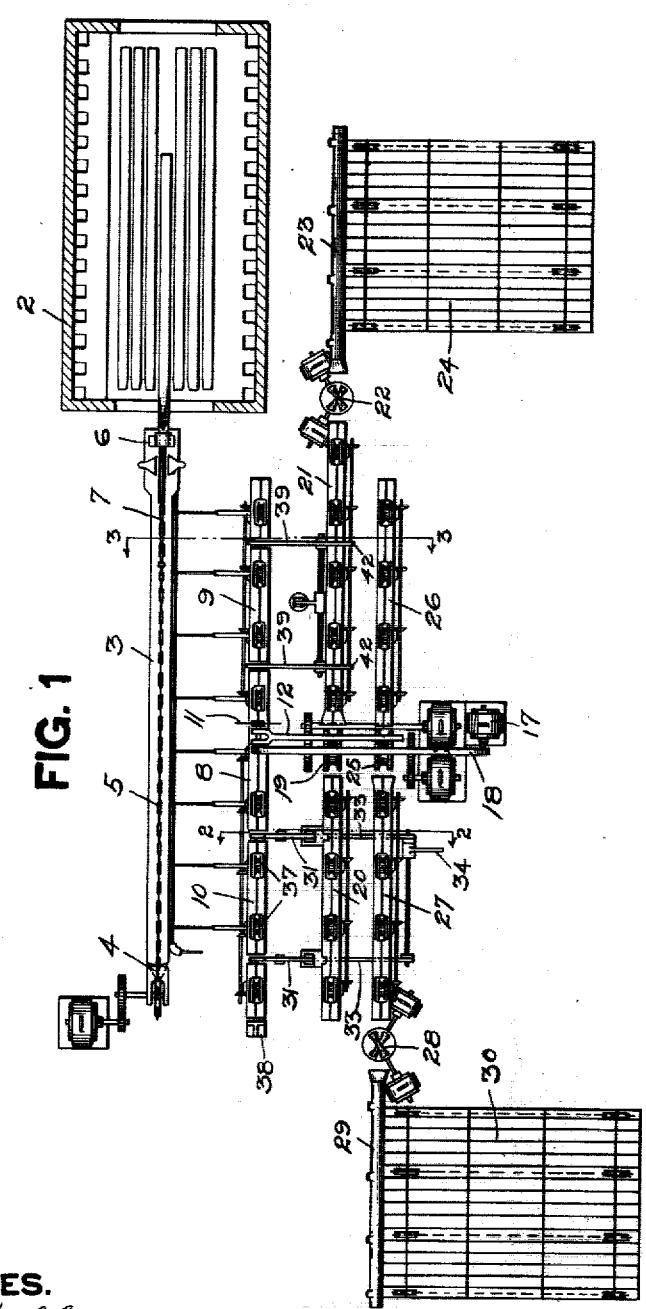
WITNESSES. INVENTOR.

No. 825,421. PATENTED JULY 10, 1906.
A. M. SAUNDERS.
APPARATUS FOR THE MANUFACTURE OF PIPE.
APPLICATION FILED JAN. 23, 1904.

2 SHEETS—SHEET 2.

WITNESSES. INVENTOR.

UNITED STATES PATENT OFFICE.

AUGUSTUS M. SAUNDERS, OF McKEESPORT, PENNSYLVANIA, ASSIGNOR TO NATIONAL TUBE CO., OF PITTSBURG, PENNSYLVANIA, A CORPORATION OF NEW JERSEY.

APPARATUS FOR THE MANUFACTURE OF PIPE.

No. 825,421.　　　　　Specification of Letters Patent.　　　　　Patented July 10, 1906.

Application filed January 23, 1904. Serial No. 190,327.

*To all whom it may concern:*

Be it known that I, AUGUSTUS M. SAUNDERS, a resident of McKeesport, in the county of Allegheny and State of Pennsylvania, have invented a new and useful Improvement in Apparatus for the Manufacture of Pipe; and I do hereby declare the following to be a full, clear, and exact description thereof.

My invention relates to the manufacture of welded tubing, and has special reference to the manufacture of what is known as "double-length" tubing, where the tube is welded of double the ordinary standard length and is severed during finishing into two tubes of ordinary standard length. Its object is to provide for the quick handling of the welded tubes.

In Letters Patent of the United States No. 715,854 to Peter Patterson, dated December 16, 1902, is described apparatus for the manufacture of such tubing, in which the welded double-length tube is passed into a feeding-trough and fed to the finishing-rolls and is either severed into two sections before passing through the first or sizing rolls of the finishing-rolls, or, if cross-rolls are employed, before passing through such cross-rolls. In the manufacture of certain sizes of this class of tubing some difficulty has been experienced from the delay consequent to the stopping of the long tube for sawing and the subsequent feeding of the two sections formed from the single tube successively along the same course and through the finishing-rolls. By the present invention difficulties of this character are overcome and means provided for the quick finishing of the two sections so formed.

To these ends it consists, generally stated, in the combination with the welding-furnace and welding apparatus in front of the same, of a receiving trough or holder at the side of the welding apparatus, a saw adapted to pass across the trough, two sets of finishing-rolls at the side of the receiving-trough and feeding-troughs for the same, and lateral transfer mechanism to transfer the tube-sections from the respective receiving-trough sections to the feeding-troughs of the respective finishing-rolls.

It also consists in certain other improvements, as hereinafter more fully set forth and claimed.

To enable others skilled in the art to practice my invention, I will describe the same more fully, referring to the accompanying drawings, in which—

Figure 3:
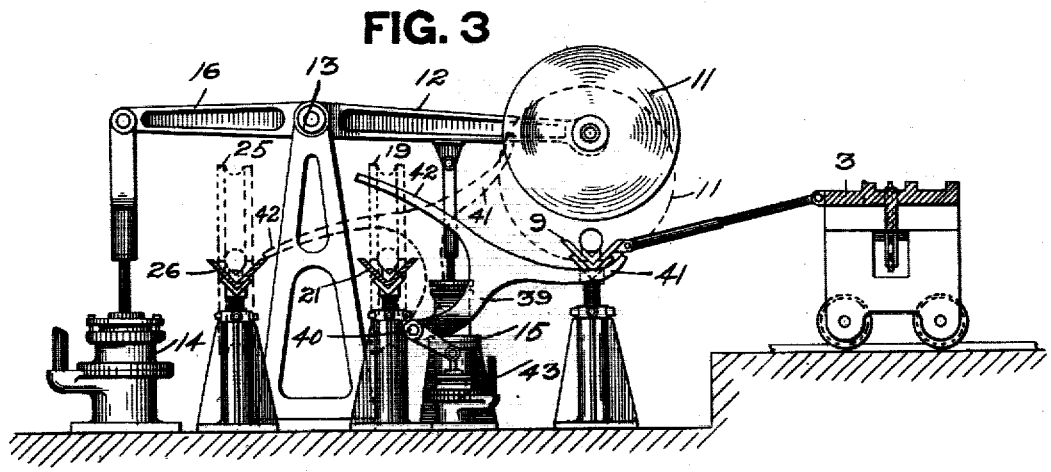
Figure 2:
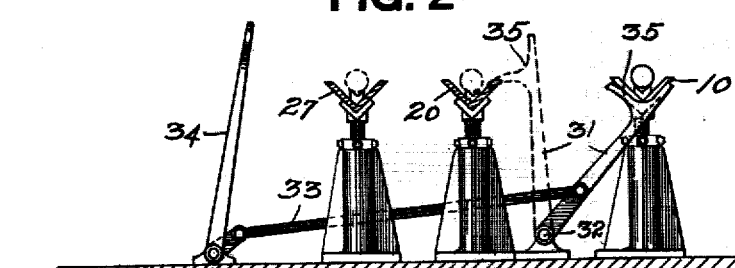

Figure 1 is a plan view of apparatus embodying the same. Fig. 2 is an enlarged cross-section on the line 2 2, Fig. 1. Fig. 3 is a like view on the line 3 3, Fig. 1; and Fig. 4 is a like section illustrating another embodiment of transfer mechanism shown in Fig. 3.

In the accompanying drawings the welding-furnace 2 is of any suitable construction, being preferably of the regenerative type, being formed of sufficient length to heat the tubes of double length, the furnace being generally about forty (40) to forty-five (45) feet long. In front of the same is the welding apparatus 3, which may be of any suitable construction.

As illustrated in the drawings, the apparatus is arranged for welding butt-weld tubing, and the welding apparatus shown is in the form of a swinging draw-bench, which is pivoted at its rear end 4 and has a continuously-running draw-chain 5 and a bell-holder 6 at its forward end, the tubing being welded by means of tongs 7, by which the blank is engaged in the furnace, a welding-bell being thrown over the tongs and the tongs connected to the draw-chain to draw the tube through the bell, which is caught in the bell-holder. At the side of this draw-bench is any suitable holder, such as the receiving-trough 8, which is formed in two sections 9 and 10, and mounted at the side of this receiving-trough and adapted to pass across the same is the saw 11. This saw is illustrated as supported in the saw-frame 12, mounted in the bearing 13 and controlled in its operations by means of the hydraulic rams 14 and 15, the ram 14 being connected to an extension 16 of the saw-frame, while the ram 15 connects with the same between its pivotal point and the saw. The two rams provide for full control of the saw. The saw is illustrated as driven by means of a motor 17 through belt or like connections 18. At the side of the receiving-trough 11 are two sets of finishing-rolls, each set being preferably formed of sizing-rolls and cross-rolls with their accompanying troughs. For example, there are the sizing-rolls 19 with their feeding trough 20, the cross-roll trough 21, cross-rolls 22, final receiving-trough 23, and at the side of the same the cooling rack or table 24. There are also the sizing-rolls 25 with the sizing-roll trough 26, cross-roll trough 27, cross-rolls 28, final receiving-trough 29, and cooling rack or table 30.

Suitable transfer mechanism is provided between the respective trough-sections of the receiving-trough and the respective sizing-roll troughs, so as to provide for transfer of the tube-sections into the proper troughs for finishing. The transfer from the trough-section 10 to the sizing-roll troughs 20 is a simple transfer which may be accomplished by means of the levers 31, pivoted between the troughs, as at 32, and operated by means of the connecting-bars 33 and hand-lever 34, as shown in Fig. 2. The transfer-levers 31 have forked upper ends, as shown at 35, and fit suitable seats in the receiving-trough sections 10, so that after the sawing of the welded tube the tube-section may be quickly lifted out of the trough-section 10 and delivered into the trough-section 20, which trough-section is provided with the power-driven rolls feeding into the sizing-rolls, the tube then passing in regular course. As the saw cuts the welded tube into sections, part of the section resting in the trough 10 is under the saw-frame 12. The tube-section must therefore be first carried longitudinally away from the saw-frame, and for that purpose this receiving-trough has driven rollers 37, so rotated as to carry the tube away from the saw, while beyond and in line with the trough-section is the abutment 38, the driven rollers 37 as soon as the tube is severed carrying the blank away from the saw until it contacts with the said abutment, being thus carried far enough to clear the body of the saw-frame. To provide for the transfer of the tube-section in the receiving-trough section 9 to the sizing-roll trough 26, it is necessary to overcome another mechanical difficulty. The blank must be transferred over the cross-roll trough 21 of the inner set of finishing-rolls, and for that purpose I prefer to employ the lateral transfer mechanism illustrated in Fig. 3. This consists of levers 39, having depending arms pivoted at 40 to bearings close to the said cross-roll trough 21, and having arms 41 extending into seats in the receiving-trough 9 in position to lift the tube-section therefrom, and having long delivery arms 42 extending in the opposite direction from the body of the lever above the cross-roll trough 21 and of sufficient length to carry the blank over into position to be delivered into the sizing-roll trough 26. To operate these lateral transfer-levers 39, I prefer to employ a ram 43, though they may be operated by hand-lever connections, if desired. In Fig. 4 is shown another form of this same transfer mechanism, which is the same in general construction except that where the troughs are placed closer it is not necessary to employ so long a lifting-arm 41 or so long a delivery-arm 42, as shown in Fig. 3.

In the practice of the invention in the manufacture of double-length tubing and with the apparatus illustrated the tube-blanks may either be in plate or strip form or may be previously bent into U-shape or tubular form, and in making butt-weld tubing they are preferably fed through the rear end of the welding-furnace into final heating position, and when their edges are at a welding heat they are grasped by the welding-tongs, a welding-bell passed over the same, the tongs connected to the draw-chain, the blank drawn through the welding-bell and welded into tubing. The double-length welded tube then passes into the receiving-trough 8 and as soon as it enters the same by means of the saw 11 it is cut into two sections, when each section is immediately transferred from such receiving-trough into the proper sizing-trough and then passed through the finishing-rolls, the receiving-trough being thus quickly emptied by a lateral transfer therefrom, so that there is practically no delay in emptying the receiving-trough and leaving it ready for the reception of the next tube to be sawed and each section formed from the long welded tube passes independently in its course for finishing. For example, as soon as the long tube is sawed into sections the tube-section in the trough 10 is carried by the driven rolls 37 in said trough until brought against the abutment 38, and thus cleared from the body of the saw-frame, and it is then lifted by the levers 31 and passed by a side transfer into the sizing-trough 20, from which it passes through the rolls 19 into the cross-roll trough 21 and into the cross-rolls 22 to the final receiving-trough 23 and onto the cooling-table 24 by the lateral transfer-levers 39 and quickly rolls over the top surface of that lever and over the delivery-arms 42 of the same (above the cross-roll trough 21 of the other finishing-rolls) until it is delivered into the trough-section 26, when it passes in regular course through the sizing-rolls 25 and cross-rolls 28 to the cooling-table. The apparatus therefore provides for the sawing of the long welded tube into lengths and their immediate delivery by a side movement or lateral transfer from the receiving-trough when they pass in regular course for finishing. Practically all liability of delay on account of the finishing of the long welded tubes is thus avoided. A further advantage of the apparatus is that in case either set of finishing apparatus becomes disabled the long tube may be severed into sections and one tube-section then finished in the apparatus in working order, when the other tube-section can be carried by the driven rollers longitudinally to the other section of the receiving-trough and then transferred laterally to and finished in the finishing apparatus in working order.

What I claim is—

1. In apparatus for the manufacture of double-length tubing, the combination of a receiving trough or holder, two sets of finishing-rolls at the side of the holder, each set having a feeding-trough in front of the same, a saw adapted to cut the double-length tube into sections when supported in said holder, and lateral transfer means for carrying the tube-sections from the holder to the feeding-troughs.

2. In apparatus for the manufacture of double-length tubing, the combination of a welding-furnace, welding apparatus in front thereof, two sets of finishing-rolls at the side of the welding apparatus, each set having a feeding-trough in front of the same, a holder between the welding apparatus and troughs, a saw adapted to cut the double-length tube into sections when supported in said holder, and lateral transfer means for carrying the tube-sections from the holder to the feeding-troughs.

3. In apparatus for the manufacture of double-length tubing, the combination of a welding-furnace, welding apparatus in front thereof, a receiving trough or holder at the side of the welding apparatus, a saw adapted to sever the double-length tube into sections when supported in said holder, and two sets of finishing-rolls at the side of the holder driven in opposite directions and adapted to receive the respective tube-sections and finish the same.

4. In apparatus for the manufacture of double-length tubing, the combination of a welding-furnace, welding apparatus in front thereof, a receiving trough or holder at the side of the welding apparatus, a saw adapted to sever the double-length tube into sections when supported in said holder, two sets of finishing-rolls at the side of the holder driven in opposite directions adapted to receive the respective tube-sections and finish the same, and lateral transfer means adapted to carry the two tube-sections from the receiving-trough into the respective feeding-troughs of the finishing-rolls.

5. In apparatus for the manufacture of double-length tubing, the combination of a welding-furnace, welding apparatus in front thereof, a receiving trough or holder at the side of the welding apparatus, two sets of finishing-rolls at the side of the holder, each having sizing-rolls and feeding and delivery troughs therefor, the feeding and delivery troughs of one set respectively overlapping the delivery and feeding troughs of the other set, a saw adapted to sever the double-length tube into sections when supported in said holder, and lateral transfer means adapted to carry one section of the tube from the holder to the feeding-trough of one set of rolls and other lateral transfer means adapted to carry the other tube-section from the holder past the delivery-trough of the first set of rolls and into the feeding-trough of the other set of finishing-rolls.

6. In apparatus for the manufacture of double-length tubing, the combination of a receiving trough or holder having an abutment at one end thereof, a saw adapted to pass across the said trough, driven rollers in one section of said trough adapted to carry the tube longitudinally away from the saw and against said abutment, and lateral transfer means to carry the blank from said trough-section.

In testimony whereof I, the said AUGUSTUS M. SAUNDERS, have hereunto set my hand.

AUGUSTUS M. SAUNDERS.

Witnesses:
JAMES I. KAY,
ROBERT C. TOTTEN.